US005591707A

United States Patent [19]
Raehse et al.

[11] Patent Number: 5,591,707
[45] Date of Patent: Jan. 7, 1997

[54] PROCESS FOR PRODUCING FREE-FLOWING GRANULES WITH SUPERHEATED STEAM

[75] Inventors: Wilfried Raehse, Duesseldorf; Johann F. Fues, Grevenbroich; Herbert Pattberg, Hilden; Kathleen Paatz, Duesseldorf, all of Germany

[73] Assignee: Henkel Kommanditgesellschaft auf Aktien, Duesseldorf, Germany

[21] Appl. No.: 416,760

[22] PCT Filed: Oct. 4, 1993

[86] PCT No.: PCT/EP93/02703

§ 371 Date: Apr. 12, 1995

§ 102(e) Date: Apr. 12, 1995

[87] PCT Pub. No.: WO94/09109

PCT Pub. Date: Apr. 28, 1994

[30] Foreign Application Priority Data

Oct. 12, 1992 [DE] Germany ............................ 42 34 376.3

[51] Int. Cl.⁶ ......................................................... C11D 11/00
[52] U.S. Cl. ........................... 510/451; 510/441; 510/443; 159/47.1
[58] Field of Search ...................... 252/89.1, 174, 252/135, 556, 558, 551, 532, 537, 539, DIG. 14; 23/293, 313 FB; 159/47.1, 48.1, DIG. 21

[56] References Cited

U.S. PATENT DOCUMENTS

| | | | |
|---|---|---|---|
| 1,985,424 | 12/1934 | Piggott | 260/124 |
| 2,016,962 | 10/1935 | Flint et al. | 260/127 |
| 2,703,798 | 3/1955 | Schwartz | 260/211 |
| 4,006,110 | 2/1977 | Kenney et al. | 252/540 |
| 4,144,226 | 3/1979 | Crutchfield et al. | 528/231 |
| 4,146,495 | 3/1979 | Crutchfield et al. | 252/89 R |
| 4,171,243 | 10/1979 | Brooks et al. | 159/48 R |
| 4,347,168 | 8/1982 | Murphy et al. | 252/547 |
| 4,552,681 | 11/1985 | Koch et al. | 252/140 |
| 4,652,391 | 3/1987 | Balk | 252/99 |
| 5,431,780 | 7/1995 | Raehse et al. | 159/48.1 |

FOREIGN PATENT DOCUMENTS

| | | |
|---|---|---|
| 0021267 | 1/1981 | European Pat. Off. . |
| 0149264 | 7/1985 | European Pat. Off. . |
| 0164514 | 12/1985 | European Pat. Off. . |
| 2412837 | 5/1978 | Germany . |
| 2921945 | 12/1980 | Germany . |
| 3939919 | 6/1986 | Germany . |
| 4030688 | 9/1990 | Germany . |
| 4204035 | 8/1993 | Germany . |
| 4204090 | 8/1993 | Germany . |
| 4209432 | 9/1993 | Germany . |
| 4206050 | 9/1993 | Germany . |
| 4208773 | 9/1993 | Germany . |
| 4206495 | 9/1993 | Germany . |
| 4206521 | 9/1993 | Germany . |
| 9206984 | 4/1992 | WIPO . |
| 9205849 | 4/1992 | WIPO . |

OTHER PUBLICATIONS

Chem.–Ing. Tech. 62 (1990) No. 10, 512–520.
AIChE Journal 18 (1970), 857 to 866.
J. Falbe (ed.), "Surfactants in Consumer Products", Springer Verlag, Berlin, 1987, pp. 54 to 124.
J. Falbe (ed.), "Katalysatoren, Tenside und Mineralöladditive", Thieme Verlag, Stuttgart, 1978, pp. 123 to 217.

Primary Examiner—Paul Lieberman
Assistant Examiner—Lorna M. Douyon
Attorney, Agent, or Firm—Ernest G. Szoke; Wayne C. Jaeschke; Real J. Grandmaison

[57] ABSTRACT

A process for producing free-flowing granules comprising the steps of (a) drying with superheated steam an aqueous mixture containing at least one surfactant selected from the group consisting of anionic surfactants and nonionic surfactants to form carrier granules having a porous inner structure, and (b) impregnating the porous inner structure of the carrier granules with an aqueous coating composition selected from the group consisting of wetting agents, detergents, cleaning agents, and mixtures thereof, to form an impregnated carrier granule.

14 Claims, No Drawings

PROCESS FOR PRODUCING FREE-FLOWING GRANULES WITH SUPERHEATED STEAM

BACKGROUND OF THE INVENTION

1. Field of the Invention

This invention relates to useful materials and mixtures thereof for use in wetting agents, detergents and/or cleaning products and, more particularly, to a new form of preparation of this known class of materials where they are present as pourable and/or free-flowing granules. More particularly, the teaching according to the invention seeks to provide products of the type in question which are distinguished by a combination of important performance parameters for the particular field of application in question which has been difficult to achieve in the hitherto conventional production of the useful materials in question on an industrial scale.

2. Discussion of Related Art

Useful materials and mixtures thereof for use in wetting agents, detergents and/or cleaning products in the form of free-flowing granules are generally obtained by drying intermediately obtained water-containing slurries of the materials in question. For decades, preparations such as these have been universally spray-dried on an industrial scale. Hot air or mixtures of air and hot combustion gases are used as the drying gas stream.

The performance requirements which pourable and free-flowing powders, granules or even more heavily compacted particulate materials such as these have to satisfy are extremely diverse and conflict with one another in many respects. For example, the useful materials or mixtures thereof are now expected to be compacted to comparatively high apparent densities, but at the same time to dissolve quickly again in the washing or cleaning process. The use of so-called fillers, which do not play a key role in the washing or cleaning process, but which can impart an increased apparent density and, to a certain extent, improved redissolvability to the dry formulations, should be limited as far as possible or, better yet, dispensed with altogether. The content of surface-active components in the solid formulations should be increased as far as possible to satisfy the concept of the optimized active-substance concentrate. However, it is known that these surfactants (both anionic and nonionic types) have a pronounced tendency to gel, particularly when dried from water-containing slurries, so that even a fine-particle material is difficult to redissolve or may even be completely insoluble. Another important factor is the well-known temperature sensitivity of many of the useful materials in question, particularly in the presence of water. Accordingly, the production of dry pourable or free-flowing useful materials and mixtures thereof for the field of application in question, for example the industrial production of laundry detergents, has developed into a high-technology industry.

Among industrial drying processes, the technology of drying with superheated steam, which has been known for about a hundred years, has recently been attracting increasing attention. The circulation of the super-heated steam used as drying gas in a closed-circuit system and the possibility of direct condensation of the vapor stream removed from the circuit create favorable conditions for the operation of such drying installations with minimal ecologically harmful emissions. However, the practical application of this technology has hitherto been confined to non-tacky, wet particulate material. For example, superheated steam is used in the drying of lignite and sewage sludge and in the drying of beet chips, biomasses and other organic products for use in animal foods, cf. for example D. Gehrmann "Entwicklungstendenzen der Trocknungstechnik in der chemischen Industrie", *Chem.-Ing. Tech.* 62 (1990) A 512–520, more particularly sub-chapters 2.2 and 3.1.

Applicants have worked extensively on the possibility of applying the principle of drying with superheated steam to useful materials and mixtures thereof for use in wetting agents, detergents and/or cleaning products. It has surprisingly been found that this drying process may also be used for the present and, for various reasons, much more sensitive field of application with the hitherto known, more particularly ecological and energy-related advantages of drying with superheated steam. Thus, DE-A 40 30 688 describes a process for recovering fine-particle, solid or free-flowing useful materials or mixtures thereof for wetting agents, detergents and/or cleaning products from water-containing preparations thereof using superheated steam as the drying hot gas stream. In this process, drying of the particulate material is terminated before it is endangered by heat.

Particular embodiments of and improvements in such drying processes using superheated steam as the hot gas stream and their application to useful materials and mixtures thereof for wetting agents, detergents and/or cleaning products are disclosed in a number of other earlier applications in Applicants' name, cf. in particular earlier German patent applications DE-P 42 04 035.3, DE-P 42 04 090.6, DE-P 42 06 050.8, DE-P 42 06 521.6, DE-P 42 06 495.3, DE-P 42 08 773.2 and DE-P 42 09 432.1.

The technical teaching described hereinafter relates to an important further development of this technology of producing dry pourable or free-flowing useful materials or mixtures thereof for wetting agents, detergents and/or cleaning products. The teaching according to the invention is based in this regard on the disclosures and working principles of DE-A 40 30 688 and the earlier applications cited above. Accordingly, the disclosures of that document and the earlier applications cited above are hereby specifically included in the disclosure of the present invention which is to be understood in conjunction with the further disclosures and working principles discussed hereinafter.

The teaching according to the invention is based on the surprising observation that the use of super-heated steam as drying medium in the drying of water-containing preparations of useful materials and mixtures thereof from the field of wetting agents, detergents and/or cleaning products enables hitherto unknown combinations of important performance properties to be established in the dry product. Building on this, further embodiments of the invention provide new preparations of useful materials which have proved superior to hitherto known materials. The replacement of the conventional hot gas phase based on combustible gases or air/combustible gas mixtures by superheated steam not only improves the ecology of the process as a whole and the specifically modified chemical/thermodynamic stressing of the material to be dried, the spatial structure of the dried material primarily developed in the micro range is also clearly influenced by the use of super-heated steam as the drying medium. The teaching according to the invention makes use of this and, in doing so, provides useful materials of the described type or mixtures thereof characterized by new properties and/or new compositions.

DESCRIPTION OF THE INVENTION

In a first embodiment, therefore, the present invention relates to useful materials and mixtures thereof for use in wetting agents, detergents and/or cleaning products in the form of free-flowing granules which are obtained by charging basic granules—hereinafter referred to as "carrier beads"—with a preparation containing useful materials of the type mentioned above—hereinafter referred to as the "coating composition". The invention is characterized in that the carrier beads are a material obtained by spray-drying and/or fluidized-bed drying in superheated steam.

In the important embodiments of the invention, at least a substantial percentage of the coating composition is introduced into the porous inner structure of the carrier beads and fills at least 10% by volume and, preferably, at least 50% by volume of the accessible space within the inner structure. It can be useful in this regard, particularly depending on the physical character of the coating composition, if only limited quantities or no significant quantities of the coating composition are present on the outer surface of the granules.

In one important embodiment, not only does the coating composition introduced into the carrier beads contain useful materials of the type mentioned, the carrier beads themselves also preferably consist at least partly and preferably at least predominantly of useful materials for wetting agents, detergents and/or cleaning products and have been produced as described above by drying a liquid and, in particular, water-containing preparation in superheated steam. Suitable surface-active materials may be used as an important useful-material constituent in the actual production of the carrier beads. Through the special elements of the invention described hereinafter, it is possible using even these compounds with their tendency to stick and gel, so that they are normally difficult to dissolve or emulsify in water, to produce highly porous and hence absorbent carrier beads which are suitable for charging the inner structure of the carrier beads with other useful materials of the type mentioned above and which, at the same time, are distinguished by optimized dissolvability or emulsifiability in the aqueous phases typically used in practice.

Accordingly, the present invention also relates to the porous carrier beads as such for the production of solid wetting agents, detergents and/or cleaning products showing improved solubility in water which are particularly suitable for use as carriers for absorbing useful materials and/or auxiliaries of the type mentioned above and which are obtained by drying a liquid and, in particular, water-containing preparation of the carrier bead material in a hot drying gas, the porous carrier beads according to the invention being characterized in that they are produced by spray drying and/or fluidized bed drying in superheated steam.

In other embodiments, the invention relates to the process for producing the granular material obtained in an at least two-stage process and to the use of the porous carrier beads and/or the granules charged with useful materials as a constituent of wetting agents, detergents and/or cleaning products in the form of a solid preparation.

In the production of solid formulations of useful materials of the type in question and mixtures thereof, the measure of charging sufficiently absorbent carrier beads formed in a first stage with liquid useful materials or with a liquid formulation of useful materials is one of the most well-known measures. Thus, nonionic surfactants liquid at room temperature and/or other liquid useful materials are introduced, for example, into a preformed powder or granules of ingredients and auxiliaries for the field of application in question. If auxiliary liquids, for example water, are used, the powder-form or granular material may be subsequently dried.

The most important elements in practice for the formation of the carrier beads are, on the one hand, the production and use of so-called tower powders which consist predominantly of water-soluble and/or water-insoluble, inorganic and/or organic constituents and additives, for example of a laundry detergent. Liquid components, such as nonionic surfactants, perfume oils and the like, may then be introduced into these tower powders. Another constituent of the tower powders are generally washing-active anionic surfactants, more particularly corresponding salts which are solid at room temperature. However, surface-active components such as these have hitherto been used in only limited quantities as part of the solid starting component. The reason for this is the pronounced tendency of the surface-active compounds—solid at room temperature—to gel in the usual drying process under the effect of hot gases and the water vapor to be removed from the starting material. The resulting gelled surfactant particles or layers are generally difficult to dissolve in water. Limiting the percentage of solid surfactant compounds used in the production of tower powders is determined inter alia by the need to ensure adequate spreading and permeation of the dried surface-active solids with inorganic and/or organic mixture constituents showing improved solubility or dispersibility in water.

Accordingly, one particular embodiment of the use of carrier beads for the production of solid formulations of useful materials of the type in question containing in particular surface-active solids is the use of particularly fine-particle and, in particular, inorganic water-insoluble carrier constituents which are suitable for dispersion in aqueous solution. Using limited quantities of binders, which may be surface-active in character, it is possible to obtain carrier beads which may be charged with other useful materials. More particularly, the fine-particle insoluble base materials are in turn useful materials for the field of application in question. Particular significance is attributed in this regard to corresponding minerals capable of ion exchange. Zeolites are important representatives in the field of detergents and cleaning products, particular significance being attributed to detergent-quality zeolite NaA and also to other fine-particle, crystalline and optionally swellable layer silicates of natural and/or synthetic origin. Carrier beads based on materials such as these may optionally be charged with increased quantities of surface-active compounds, although in this case, too, the percentage content of nonionic and/or anionic surfactant compounds in the end product is comparatively low, for example up to at most 35% by weight, based on the charged carrier beads (see, for example, the disclosures of EP-B1 0 149 264 or EP-A1 0 021 267).

Known charged carrier beads of the type in question are generally characterized in that the useful material introduced is predominantly or completely deposited on the outside of the carrier beads, i.e. on the surface thereof. Sufficiently coherent porous granules of fine-particle insoluble solids can thus be particularly suitable carrier bead materials for hitherto known methods. Through granulation of the insoluble fine particles, they provide a large-surface carrier material which is accessible to coating with a liquid composition and/or with a composition applied in free-flowing form.

Hitherto, it was not regarded as possible to use useful materials of the type in question solid at room temperature as carrier beads for absorbing other useful materials for detergents and cleaning products of which a substantial percentage, for example well above one third of the carrier beads as a whole or even the predominant part of the carrier beads, is formed by surface-active useful materials. The basis here is the knowledge of the poor solubility and tendency towards gelation of highly concentrated surfactant mixtures solid at room temperature on introduction into aqueous phases. The teaching according to the invention builds on the surprising observation that dry mixtures of useful materials of the type according to the invention obtained by drying in superheated steam differ distinctly in their behavior from the same mixtures of useful materials conventionally dried with hot gases.

This observation is at variance with the existing knowledge of experts which comes closest to the teaching according to the invention. DE-A 40 30 688 cited at the beginning refers in column 2, lines 28 to 30 to the literature reference of A. M. Tromelen et al. entitled "Evaporation and Drying of Drops in Superheated Steam", AIChE Journal 18 (1970), 857 to 887. The authors of this Article investigated the behavior of isolated individual drops on the one hand in hot air and on the other hand in superheated steam. Wet materials of diverse origin were used. In addition to pure water, various water-containing preparations from the food industry, solutions and suspensions of purely inorganic materials and, finally, drops of an aqueous solution of a commercial laundry detergent were used. More particularly, the authors of the Article in question investigate and describe the structural changes which the material undergoes in the course of drying and compare the product quality of the droplets dried on the one hand in hot air and, on the other hand, in superheated steam. For the steam-dried droplets of the aqueous detergent preparation, a considerably higher density of the dry product is observed at the gas phase temperature of 250° C. The authors come to the following overall conclusion (loc. cit., page 866):

"No radically different properties of the dried particles result from drying in steam as compared with air. However, drops dried in steam sometimes yield denser particles. Dehydration and thermal degradation occur just as readily in both drying media."

By contrast, the teaching according to the invention builds on the surprising observation that useful materials and mixtures thereof from the field of wetting agents, detergents and/or cleaning products and, more particularly, corresponding mixtures containing surface-active components lead to totally different results on the one hand where drying is carried out in superheated steam and, on the other hand, where drying is carried out in conventional hot gases. In the second case, a temperature and moisture gradient is rapidly established in the drop inwards from its surface. The surface of the drop dries rapidly and a solid crust is formed. Liquid diffuses outwards from the inside of the drop, substances dissolved in the water crystallizing out when their solubility is exceeded. This results in further hardening and thickening of the outer shell.

By contrast, the drying of a drop in superheated steam follows a totally different course. When the drop not yet heated to boiling temperature comes into contact with superheated steam, water initially condenses on the surface, a film of water being formed around the drop. The heat of condensation is transferred to the interior of the drop. When the evaporation temperature is reached in the drop, drying in the one-component water/steam system takes place throughout the drop in accordance with the vapor pressure curve, i.e. the water begins to evaporate throughout the drop. In other words, a rigid outer shell, which would prevent the drop from contracting any further, is not formed right at the beginning, as in drying with hot gases. The drop dries uniformly over its cross-section, numerous small steam channels evidently being established throughout the solid structure formed. The dry mass formed thus becomes extremely porous. The teaching according to the invention makes use of this. The high porosity of the solid material can be the basis for substantially improved solubility in water and/or for a greatly increased absorption capacity of the steam-dried material for liquid phases by comparison with conventionally dried material. According to the invention, therefore, not only does the outer particle surface of the granular carrier beads become accessible to coating with the coating composition, the inner surface and hence ultimately the entire freely accessible inner space of the carrier beads dried in the superheated steam can be coated or filled with the coating composition.

The first embodiment of the teaching according to the invention described above makes use in particular of this increased absorbency or absorption capacity of the dry materials which have been obtained using superheated steam as the drying medium. In this case, a material obtained by spray drying and/or fluidized bed drying in superheated steam is used for the carrier beads which, in a second stage of the process, are charged with useful materials or mixtures of useful materials from the field of wetting agents, detergents and/or cleaning products. This second charging step, which will be discussed in more detail in the description of the process according to the invention for the production of the charged carrier beads, generally takes place under conditions under which the composition to be introduced is present in free-flowing form. Accordingly, useful materials liquid at room temperature and/or at the working temperature and/or solutions, emulsions and/or dispersions of useful materials are particularly suitable for charging. In the case of solutions, emulsions and/or dispersions, the auxiliary liquid used for charging, more particularly water, may be subsequently removed. However, the technical teaching according to the invention is by no means confined to this form of charging. The carrier beads may also be charged with melts of the components to be introduced as the coating composition. By adopting suitable measures known per se to the expert, it is possible to ensure that the coating composition is absorbed to the required extent into the porous interior of the carrier beads.

In one important embodiment, not only are the useful materials or mixtures thereof to be used as the coating composition corresponding components from the field of wetting agents, detergents and/or cleaning products. In this embodiment, the carrier beads themselves are also formed at least partly and preferably at least predominantly from useful materials for wetting agents, detergents and/or cleaning products which have been converted into the dry material by drying of a free-flowing, more particularly water-containing preparation in superheated steam. According to the invention, the dried carrier beads are preferably present as solids at temperatures in the range from about 100° to 110° C. and preferably at temperatures in the range up to about 120° C., their plasticity and surface tackiness being limited by a suitable choice and combination of the components forming the carrier beads to such an extent that there is no significant adhesion of the particles to one another and/or within their open-pored inner structure, even under the conditions of exposure to the superheated steam. Accordingly, the teaching according to the invention ensures that the special, highly porous structure of the dry material initially accumulating during the drying with superheated steam is fixed in such a way that it remains intact under the unavoidable mechanical stresses to which such granular material is exposed in the form of pressure and mutual contact, even at elevated temperatures and optionally in the presence of superheated steam.

The porous inner structure thus stabilized as the primary outcome of production of the carrier beads by drying in superheated steam becomes an important determining element of the teaching according to the invention in its various aspects. This porous inner structure is used to charge the accessible inner volume with at least substantial parts of the coating composition. The dissolving behavior of the charged carrier beads in aqueous liquors can be critically influenced by forming the coating composition in a certain way, as will be explained hereinafter. The coating composition can be absorbed completely or almost completely into the interior of each carrier bead so that little, if any, of the coating composition is left behind on its surface. Equally, however, the porous interior may be partly or completely charged with selected components as the coating composition and more of the same coating composition or another coating composition may be used to coat the outer surfaces of the carrier beads. In this way, the teaching according to the invention provides a freedom of choice with respect to technical procedure which has never before been available in the specialist field in question.

Carrier beads

In one particularly important embodiment of the teaching according to the invention, the carrier beads as such are made up using considerable quantities of surface-active useful materials. The content of such surfactants in the carrier beads may amount, for example, to at least about 10% by weight or even considerably more, for example to at least about 20 to 30% by weight. In important embodiments, the surfactant content of the uncharged carrier beads amounts to at least about 35% by weight. In particularly important variants of this embodiment, the surfactant content of the uncharged carrier beads is at least about 50% by weight and can even amount to between 90 and 95% by weight, based on the carrier beads. Special cases in which the carrier beads can be formed almost completely from the surface-active component by choosing the right surfactant are described in the following.

The higher the content of surface-active component in the carrier beads, the more pronounced are the individual properties of the surfactant used in the behavior of the porous carrier beads. So far as the teaching according to the invention is concerned, this means that surfactant components sufficiently solid at temperatures in the range from about 100° to 120° C. are preferred materials. Anionic surfactants are particularly suitable in this regard. The production of anionic surfactant concentrates by spray drying and/or fluidized bed drying in superheated steam is the subject of earlier German patent application DE-P 42 06 050.8 cited at the beginning of which the disclosure is hereby specifically included as part of the disclosure of the present invention. In preferred embodiments of the present invention, these anionic surfactant concentrates are mixtures with water-soluble and/or fine-particle water-insoluble inorganic and/or organic auxiliaries and/or useful materials which are selected to ensure the limitation of plasticity and/or surface tackiness at temperatures of 100° to 120° C. which is crucial to the invention. In preferred embodiments of the invention, these mixture components are present in small quantities, based on the anionic surfactants in the carrier beads. Accordingly, the invention provides access for the first time to solid, dry preparations of useful materials from the field of wetting agents, detergents and cleaning products in which solid carrier beads are based at least predominantly on surface-active components and, more particularly, on anionic surfactants. No such preparations are known in conventional detergent technology.

The temperature behavior of the components forming the carrier beads and, more particularly, the behavior of the surface-active components used in the preferred embodiment of the invention at temperatures in the range from about 100° to 120° C. has a critical bearing on the particular composition to be selected for the useful materials and auxiliaries involved in the formation of the carrier beads. Although important anionic surfactants, for example fatty alcohol sulfates (FAS) of long-chain fatty alcohols, a number of washing-active sulfonates and also nonionic surfactants, for example alkyl glycoside compounds of long-chain fatty alcohols, are stable as solids in the temperature range in question, their plasticity and, in particular, their surface tackiness may already have undergone a fairly significant increase. For starting materials of this type, it is intended in accordance with the invention to make those constituents which, thermally, are not entirely satisfactory fully usable for the carrier beads by using mixture components which guarantee the required thermal stability and, in particular, the required low values for surface tackiness and plasticity. These mixture components may be useful materials in the context of conventional detergent mixtures and also auxiliaries which, although having no function of their own in the intended application, do not interfere with the use of the useful materials prepared in accordance with the invention or combinations thereof. The auxiliaries in question may be soluble and/or insoluble in water and may be inorganic and/or organic in character. Where the compounds in question are insoluble in water, fine-particle inorganic and/or organic auxiliaries are normally used. The following observations are made purely by way of example:

Inorganic/organic auxiliaries

Suitable water-soluble inorganic auxiliaries for reducing the surface tackiness and plasticity of organic components are salts, such as phosphates, particularly STP, sodium sulfate or sodium carbonate. However, the same function can also be performed by soluble sodium silicates of the waterglass and/or alkali metal hydroxide type. Insoluble inorganic mixture components for stabilizing the consistency of the carrier beads and reducing their surface tackiness are, for example, builder components based on zeolite, more particularly detergent-quality zeolite NaA, other swellable or non-swellable layer silicates, for example corresponding montmorillonites, such as bentonite, and the like. However, other builder components based on solid, more particularly crystalline, silicate compounds, which are known in modern detergent technology, are also suitable. Particulars of such builder components are given in the following.

Corresponding auxiliaries can be found among organic components. For example, salts of low molecular weight organic components in sufficiently dried form are generally non-tacky components, even at elevated temperature. Corresponding organic builders, such as the alkali metal salts of polycarboxylic acids, for example citric acid, adipic acid, succinic acid, nitrilotriacetic acid and the like, are suitable non-tacky components. However, organic polymers of the type typically used in detergents, for example corresponding components based on cellulose derivatives and/or PVP, or even inert organic polymer materials, such as cellulose powder and the like, are also suitable as auxiliaries for stabilizing the carrier beads, even at high temperatures.

Basically, suitable mixtures and mixing ratios may be determined in preliminary tests conducted by methods familiar to the expert. After the preliminary tests in question have been carried out, the mixtures selected may be subjected to spray drying from water-containing preparations in superheated steam. In the subsequent treatment with a free-flowing phase, the dry granules formed show whether and to what extent the required finely porous structure and, hence, the chargeability of the carrier beads formed, even in their inner structure, have been developed.

It is crucial to the understanding of the teaching according to the invention that anionic surfactants of synthetic and/or natural origin, such as are typically used in modern wetting agents, detergents and cleaning products, can be converted by the use of generally limited quantities of auxiliaries into sufficiently heat-stable and non-tacky solids and, hence, worked up into porous carrier beads with an open-pore inner structure. In this way, it is possible for the first time to provide porous carrier beads formed predominantly by anionic surfactants for absorbing other detergent ingredients.

In special cases, it is even possible to form the porous carrier beads from the anionic surfactant without using any auxiliaries. One such case are the so-called disalts which are known to be salts, preferably alkali metal salts, of washing-active alpha-sulfonated sulfo-fatty acids. Disalts or disalt mixtures of technical purity can not only be worked up into porous carrier beads without the addition of further auxiliary components, they may themselves be auxiliaries for thermally less stable anionic surfactant components, such as FAS, FAES, MES, ABS and the like.

Surfactants

In one preferred embodiment of the invention, the porous carrier beads are basically formed using anionic surfactants from the classes of carboxylates, sulfonates, including ester sulfonates, disalts and/or sulfates. The carrier beads may contain selected anionic surfactants or mixtures of several anionic surfactants which are generally made up in admixture with water-soluble and/or fine-particle water-insoluble, inorganic and/or organic, non-surface-active auxiliaries and/or useful materials. In this particular embodiment of the invention, the content of inorganic and/or organic auxiliaries in the carrier beads preferably does not exceed 60% by weight and, more preferably, is in the range from about 5 to 50% by weight, quantities of these auxiliaries for sufficiently stabilizing the anionic surfactants, even at temperatures in the range from about 100° to 120° C., in the range from about 10 to 30% by weight being particularly preferred. All these percentages by weight are based on the uncharged dried carrier beads.

In other important embodiments of the invention, the anionic surfactants are present in the basic structure of the carrier beads in admixture with other sufficiently thermally stable useful materials from the field of wetting agents, detergents and/or cleaning products. A full list of suitable useful materials is given in the following. In another important embodiment, however, components capable of improving the dissolution of the anionic surfactants in aqueous phases are also particularly suitable for use as additives. Examples of such components are typical dispersants, hydrotropes, structure breakers and the like.

Coating compositions

As mentioned at the beginning, one particularly important embodiment of the invention is concerned with the granules to be produced in at least two stages which contain the above-described carrier beads charged with a "coating composition" which in turn has been formed using useful materials from the field of wetting agents, detergents and/or cleaning products.

Although this coating composition may be substantially applied to the surface or rather to the outer parts of the carrier beads initially formed, at least part of the coating composition is applied to penetrate deeply into the porous carrier beads in the preferred embodiment. This explains why preferred coating compositions according to the invention are preparations which are liquid at the application temperature and which contain useful materials and/or auxiliaries from the field of application in question. In a preferred embodiment, at least 10% by volume and preferably at least 50% by volume of the inner structure, based on the accessible inner volume of the carrier beads, is filled with the coating composition. The accessible inner volume is determined in known manner, for example using liquid mercury. In important embodiments of the invention, the accessible inner volume of the carrier beads is filled substantially completely with coating composition.

In one important embodiment, the coating composition is present on the outer surfaces of the carrier beads in only limited quantities substantially corresponding at most to the inner filling and preferably amounting to less than the inner filling. In a variant of this embodiment, the coating composition is not present in substantial quantities on the outer surfaces of the carrier beads. This can be of advantage, for example, when the coating composition consists of materials that are free-flowing and/or tacky at room temperature.

However, other versions of the materials in question also fall within the scope of the teaching according to the invention. Thus, the carrier beads may be internally and externally impregnated with coatings of different composition. For example, the available inner volume of the carrier beads may be partly or completely charged with a first coating composition in a first treatment stage. In a second stage, a coating of the same or different composition may be applied to the fine particles. The second coating composition then hardens predominantly or exclusively on the outer surface of the beads. The significance of such a measure is illustrated by the following example: in the first stage of impregnation of the porous carrier beads with coating composition, a material liquid at room temperature may be introduced for example into the porous solid beads. If the liquid composition thus introduced—as a freely selectable formulation and/or as a mixture of useful materials particularly stable in storage—is then to be safely prevented from bleeding or diffusing out, the carrier beads impregnated with the liquid phase may be enveloped in a shell of an inorganic and/or organic solid which ultimately disappears during the intended application—for example through dissolution in the aqueous liquor—and hence makes the carrier beads and their impregnation available for the intended application.

The observations on the choice of the coating composition to be applied and introduced in the second stage of the process derive from the knowledge of the finely porous structure of the carrier beads, from the particular composition selected for the carrier beads and from the known requirements which wetting agents, detergents and/or cleaning products are expected to satisfy according to the prior art. Basically, selected useful materials or even mixtures of useful materials may be used as such or, if desired, even in admixture with auxiliaries. The auxiliaries may be divided into auxiliaries which are intended to remain in the impregnated carrier beads and auxiliaries which merely facilitate the impregnating application of the coating composition. Auxiliaries of the second type are generally liquids, crucial significance being attributed in this regard to water. Thus, the components of the coating composition—providing they are not themselves liquid phases sufficiently free-flowing at the application temperature—may be introduced into the carrier beads in the form of, in particular, aqueous solutions, emulsions and/or dispersions or even in the form of melts. After adequate impregnation, the water used as auxiliary liquid may if necessary be completely or partly removed from the now impregnated material.

In another embodiment of the invention, however, use may also be made of the fact that the known possibilities of granulation of the initially fine-particle or powder-form material open up during the introduction of the liquid phases and particularly aqueous liquid phases, so that in this embodiment the introduction of the coating composition into the carrier beads and their impregnation with these useful materials can be combined with the conversion of a comparatively fine-particle material into coarser agglomerates. Reference is made in this regard to general specialist knowledge.

The choice of the components for the coating or impregnation of the porous carrier beads with useful materials and optionally auxiliaries from the specialist field in question is again determined by the general considerations of the expert, particularly on the intended composition of the washing- or cleaning-active multicomponent mixture, on the temperature sensitivity of individual components, on the establishment of desired effects during the conversion of the initially dry useful-material preparation into aqueous solutions, emulsions and/or suspensions in practical application and the like. Taking into account the principles explained in the description of the invention for making up such a multicomponent material in accordance with the invention, the expert may select from various options with regard to procedure. Accordingly, without any claim to completeness, the following observations are made on the characteristics of suitable and important components of the coating composition and the forms in which they are used.

An important general concept so far as selection is concerned is determined by the fact that the coating composition may be introduced at room temperature or even at elevated temperatures of up to about 100° C. A particular advantage in this regard is that, in the second step of impregnation of the carrier beads initially obtained, any lasting adverse thermal and/or hydrolytic effects on the beads no longer exist or can be safely eliminated. Impregnation can normally be carried out in ambient air or, if desired, even in an inert atmosphere, for example of nitrogen. The introduction and the impregnation of the carrier beads with the liquid coating composition can take place at room temperature or at only moderately elevated temperatures, for example of up to about 80° C. Normally, temperatures from room temperature to about 75° C. are suitable, temperatures in the range from about room temperature to 50° C. being particularly suitable.

Free-flowing and, in particular, liquid components suitable for impregnating the carrier beads are again washing- and/or cleaning-active surfactants, more particularly nonionic surfactants of the type which are widely used in the routine production of detergents and cleaning products and which are distinguished by the fact that they are present as liquids at room temperature or at the slightly elevated temperatures mentioned. Suitable nonionic surfactants may be selected on the strength of general specialist knowledge, summary observations on the subject being made in the following.

However, the surface-active components of the coating composition may also be anionic surfactants which, on account of their thermal instability and/or tackiness at temperatures of about 100° to 120° C. in the superheated steam phase, are unsuitable for use or at least present difficulties in the production of the carrier beads. The anionic surfactants in question may optionally be introduced into the carrier beads in the form of a melt or, more particularly, in the form of aqueous emulsions.

Important other typical components from the field of detergents and cleaning products are, in particular, temperature-sensitive constituents or other components which are unsuitable for use in the production of the carrier beads for general reasons well known to the expert. A typical example of such components are fragrances and perfumes and components which, during dissolution of the granular multicomponent mixture in practical application, are intended to pass as quickly as possible into the aqueous phase without being prevented from doing so by the comparatively slower dissolution of surface-active useful materials. However, any other useful materials from the field of wetting agents, detergents and/or cleaning products, i.e. for example other organic and/or inorganic builders/co-builders, redeposition and discoloration inhibitors, foam regulators, bleach activators, optical brighteners and dyes or, quite simply, water-soluble alkalizing agents, are also basically suitable.

In one important embodiment, the invention makes use of the fact that the highly porous basic structure of the carrier beads provides them with a sponge-like absorption capacity so that the carrier beads can be impregnated with secondarily introduced components. If surface-active components which, themselves, are relatively difficult to dissolve or emulsify or disperse in aqueous phases are used in the carrier beads, the object of impregnating the porous carrier beads with the coating composition may be to introduce solubilizing auxiliaries and/or so-called structure breakers. It will readily be appreciated that this provides for optimal mixing of sparingly soluble components of the useful materials with auxiliaries for improving solubility or emulsifiability.

The invention provides a further possibility in this regard. The auxiliaries or structure breakers to be introduced into the highly porous carrier beads in the second step to improve dissolution may be further modified or selected in such a way that the melting temperature or liquefaction temperature of the auxiliaries or useful materials to be introduced is taken into consideration. Two basic possibilities are available in this regard. In a first embodiment, the carrier beads are filled with a second useful-material phase which is liquid at room temperature or only slightly elevated temperatures. This may be sufficient or even desirable for many applications. In a second variant of this embodiment, however, the auxiliaries selected are solid at room temperature and even at only moderately elevated temperatures and can act on the carrier beads, for example during the storage and/or processing of such useful materials or mixtures thereof. If the melting point or rather the melting range of the coating composition ensures that the material introduced in the second step remains in the solid phase, even on exposure to heat, the highly porous structure of the carrier beads can be fixed pending their practical application as wetting agents, detergents and/or cleaning products. In addition, the unwanted separation or bleeding of a liquid phase can be suppressed, even in the event of prolonged storage and/or mixing with other active components.

As already mentioned, the porous basic structure of the carrier beads can be completely filled with the coating composition, although it is also possible to fill only part of the porous basic structure with other useful materials and optionally auxiliaries and, for the rest, to obtain the porous empty structure of the carrier beads. Accordingly, another embodiment of the invention is characterized in that the coating composition of the second stage is used in quantities (% by weight, based on the dry weight of the carrier beads) of from at least about 1% by weight to the maximum filling capacity of the carrier beads. Quantities of the coating composition of from about 3 to 100% by weight and preferably in the range from about 3 to 80% by weight can be particularly useful. In many cases, the quantity of useful materials and optionally auxiliaries to be introduced in the second step is determined by formulation-related considerations. Accordingly, it can be advisable to use the coating composition in quantities of up to about 50% by weight, quantities in the range from about 10 to 35% by weight of the coating composition (based on the dry weight of the carrier beads) again often being desirable. Where the coating composition is used in limited quantities, i.e. for example in quantities of up to about 50% by weight and more particularly in quantities of from about 10 to 35% by weight, the amounts introduced into the carrier beads are absorbed completely or substantially completely into the interior of the beads.

As mentioned above, particularly important components for making up the coating composition in the case of carrier beads containing anionic surfactants are washing-active or cleaning-active nonionic surfactants which preferably belong to the classes of polyglycol ethers containing organophilic residues, corresponding polyglycol esters, mixed ethers and/or mixed esters, washing- or cleaning-active alkyl polyglycoside compounds, sugar and/or protein surfactants and/or even to the class of nonionic special surfactants.

However, nonionic surfactants can also be particularly important as solubilizing dispersants, structure breakers and the like. In this case, the structure of the components to be introduced is not adapted to their activity as detergents and cleaning products, instead the intended function of facilitating the dissolution of the principal surfactant components in aqueous solution is the prime consideration. Reference is again made in this regard to relevant specialist knowledge.

The teaching according to the invention is applicable to useful materials or to mixtures of useful materials from the field of wetting agents, detergents and/or cleaning products which may be assigned to the class of corresponding synthetic useful materials or corresponding useful materials of natural origin. Particularly important anionic surfactant components for use in the production of the carrier beads are alkylbenzene sulfonates (ABS), fatty alcohol sulfates (FAS), fatty alcohol ether sulfates (FAES), alpha-methyl ester sulfonates (MES) and/or disalts. Where ABS, FAS, FAES and/or MES is/are present as the principal constituent of the carrier beads, it is preferred to use limited quantities of temperature-stable soluble and/or fine-particle insoluble, organic and/or inorganic components which are non-tacky in their dry state.

As already mentioned, the disalts, i.e. the alkali metal salts of washing-active alpha-sulfofatty acids, occupy a special position insofar as they are capable both of performing the function of the principal anionic surfactant component and of being used as a temperature-stabilizing and tackiness-reducing additive in the carrier beads in admixture with other surface-active compounds.

The teaching of the invention also specifically encompasses the porous and non-impregnated carrier beads made up as described above with a content of useful materials and optionally auxiliaries from the field of application in question coupled with improved solubility in water. Where these non-impregnated carrier beads are used as a constituent of wetting agents, detergents and/or cleaning products in solid form, particularly valuable results are obtained when the dried carrier beads are present as solids at temperatures of 100° to 110° C. and preferably at temperatures of up to about 120° C., their plasticity and surface tackiness being limited to such an extent that there is no significant adhesion of the particles to one another and/or within their open-pored inner structure, even under the conditions of exposure to the superheated steam.

As mentioned above, the present invention also relates to the process for producing the granular material which comprises useful materials and/or auxiliaries from the field in question applied to highly porous carrier beads in a second and optionally further stage(s) and introduced in particular by impregnation. The process according to the invention is characterized in that aqueous preparations of the materials forming the carrier beads are subjected to drying in superheated steam, more particularly to corresponding spray drying and/or fluidized-bed drying, and the carrier beads formed are subsequently impregnated with a liquid preparation of useful materials from the field of wetting agents, detergents and/or cleaning products, are preferably impregnated throughout and, if necessary, the impregnated material is subsequently dried.

The material is preferably applied to the preformed carrier beads at temperatures of at most about 110° C. and, more particularly, at temperatures in the range from 75° to about 100° C. Application of the material may be carried out immediately after discharge of the warm material from the superheated steam drying zone, thus eliminating the need for a separate stage for reheating the dried carried beads. The material may be applied in known manner, for example in a fluidized bed or in suitable mixers. It can be of advantage to preheat the liquid preparation used for impregnation and/or even the carrier beads as such to raised temperatures in the working range.

As mentioned above, the introduction of the liquid preparations into the carrier beads may be used to granulate a fine-particle material in known manner. If auxiliary liquids, particularly water, are used during application of the coating composition and/or during simultaneous granulation, it may be advisable to remove the water at least partly from the impregnated mixture of useful materials by subsequent drying unless the principle of "internal drying", more particularly by binding the water as water of crystallization, can be utilized through the inclusion of suitable mixture components, particularly components which bind water of crystallization, in the mixture of useful materials.

Useful materials or mixtures of useful materials

The useful materials or mixtures of useful materials according to the invention may be produced in a broad range of apparent densities. This applies both to the embodiment of the porous non-impregnated carrier beads and in particular to the impregnated multicomponent mixtures in the form of the granular material produced in at least two process steps. Thus, in preferred embodiments, the apparent density of the porous carrier beads can be above about 200 g/l and, more particularly, above about 300 g/l, apparent densities of at least about 350 g/l generally having to be established through the choice of suitable process conditions for drying with superheated steam. The apparent density can be significantly increased by suitably modifying the impregnation of the porous carrier beads with useful materials and/or auxiliaries. Apparent densities of 350 to 700 g/l and, if desired, even higher can be established. Routine considerations of the expert can be useful in this regard, as illustrated by the following example: the inclusion of inorganic, crystallizing water-soluble auxiliaries and/or useful materials and their percentage content in the end product determines the apparent density of the end product to a significant extent.

Without any claim to completeness, further observations on useful materials and auxiliaries from the specialist field in question are presented in the following, again with specific reference to the general knowledge of the expert.

a1) Suitable anionic surfactants of sulfate or sulfonate structure are, for example, alkylbenzene sulfonates, alkane sulfonates, olefin sulfonates, alkyl ether sulfonates, glycerol ether sulfonates, α-methyl ester sulfonates, sulfofatty acids, alkyl sulfates, fatty alcohol ether sulfates, glycerol ether sulfates, hydroxy mixed ether sulfates, monoglyceride (ether)sulfates, fatty acid amide (ether)sulfates, sulfosuccinates, sulfosuccinamates, sulfotriglycerides, isethionates, taurides and alkyl oligoglucoside sulfates. If the anionic surfactants contain polyglycol ether chains, they may have a conventional homolog distribution, although they preferably have a narrow-range homolog distribution.

a2) Suitable anionic surfactants of carboxylate structure are, for example, soaps of natural or synthetic, preferably saturated fatty acids. Soap mixtures derived from natural fatty acids, for example coconut oil fatty acid, palm kernel oil fatty acid or tallow fatty acid, are particularly suitable. Soap mixtures of which 50 to 100% consist of saturated $C_{12-18}$ fatty acid soaps and 0 to 50% of oleic acid soaps are preferred. Amide soaps, ether carboxylic acid salts and sarcosinates are also suitable.

a3) In the context of the present invention, "anionic surfactants of sulfate, sulfonate and/or carboxylate structure" are also understood to include amphoteric or zwitterionic surfactants which contain at least one of these groups in the molecule. Typical examples are alkyl amidobetaines, aminopropionates, aminoglycinates, imidazolinium betaines and sulfobetaines.

The anionic surfactants may be present in the form of their sodium, potassium and ammonium salts and also in the form of soluble salts of organic bases, such as mono-, di- or triethanolamine. The substances mentioned are all known compounds. Particulars of their structure and production can be found in relevant synoptic works, cf. for example J. Falbe (ed.), "Surfactants in Consumer Products", Springer Verlag, Berlin, 1987, pages 54 to 124 or J. Falbe (ed.), "Katalysatoren, Tenside und Mineralöladditive", Thieme Verlag, Stuttgart, 1978, pages 123 to 217.

b) Nonionic surfactant compounds in the context of the teaching according to the invention may perform various functions as useful materials. On the one hand, they are washing-active components which cooperate synergistically with the anionic surfactants in the usual way. On the other hand, however, greater significance can also be attributed to the class of nonionic surfactants, for example in the form of dispersants, structure breakers and the like.

Nonionic surfactant compounds may be liquid or solid at room temperature, as known per se. With reference to general specialist knowledge, the following nonionic surfactant compounds are mentioned by way of example:

b1) The liquid alcohol ethoxylates used as nonionic surfactants are derived, for example, from primary alcohols preferably containing 9 to 18 carbon atoms and, on average, 1 to 12 moles of ethylene oxide in which the alcohol radical may be linear or methyl-branched in the 2-position or may contain mixtures of linear and methyl-branched radicals such as are typically present in oxo-alcohol radicals. However, linear radicals of alcohols of native origin containing 12 to 18 carbon atoms, for example of coconut oil fatty alcohol, tallow fatty alcohol or oleyl alcohol, are particularly preferred.

$C_{12-14}$ alcohols containing 3 EO or 4 EO, $C_{9-11}$ alcohols containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO, can be particularly preferred.

The degrees of ethoxylation mentioned are statistical mean values which, for a special product, may be a whole number or a broken number. Preferred alcohol ethoxylates have a narrow-range homolog distribution (narrow-range ethoxylates, NRE). Alcohol ethoxylates containing on average 2 to 8 ethylene oxide groups are particularly preferred.

b2) Other suitable nonionic surfactants are alkyl oligoglycosides corresponding to general formula (I):

$$R^1—O—[G]_x \qquad (I)$$

in which $R^1$ is a primary linear or 2-methyl-branched aliphatic radical containing 8 to 22 and preferably 12 to 18 carbon atoms and G stands for a glycose unit containing 5 or 6 carbon atoms, preferably glucose. The degree of oligomerization x, which indicates the distribution of monoglycosides and oligoglycosides, is a number of 1 to 10 and, for example, lies in the range from about 1.2 to 4 and, more particularly, 1.2 to 2.

b3) Nonionic surfactants of the amine oxide type, for example N-coconut oil alkyl-N,N-dimethyl amine oxide and N-tallow alkyl-N,N-dihydroxyethyl amine oxide, and of the fatty acid alkanolamide type may also be suitable. The quantity in which these nonionic surfactants are present is preferably no more than that of the ethoxylated fatty alcohols and, in particular, no more than half that quantity.

b4) Other suitable surfactants are polyhydroxyfatty acid amides corresponding to formula (II):

$$\begin{array}{c} R^3 \\ | \\ R^2CO—N—(Z) \end{array} \qquad (II)$$

in which $R^2CO$ is an aliphatic acyl radical containing 6 to 22 carbon atoms, $R^3$ is hydrogen, an alkyl or hydroxyalkyl radical containing 1 to 4 carbon atoms and (Z) is a linear or branched polyhydroxyalkyl radical containing 3 to 10 carbon atoms and 3 to 10 hydroxyl groups. The polyhydroxyfatty acid amides are known substances which may normally be obtained by reductive amination of a reducing sugar with ammonia, an alkyl amine or an alkanolamine and subsequent acylation with a fatty acid, a fatty acid alkyl ester or a fatty acid chloride. Processes for their production are described in U.S. Pat. Nos. 1,985,424, 2,016,962 and 2,703,798 and in International patent application WO 92/06984 (Procter & Gamble). The polyhydroxyfatty acid amides are preferably derived from reducing sugars containing 5 or 6 carbon atoms, more particularly from glucose. Accordingly, the preferred polyhydroxyfatty acid amides are fatty acid-N-alkyl glucamides corresponding to formula (III):

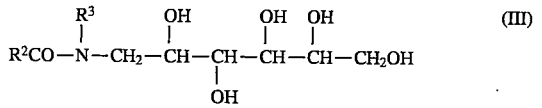

$$\begin{array}{c} R^3 \quad\; OH \quad\;\; OH \;\; OH \\ |\quad\;\; |\quad\;\;\; |\;\;\; | \\ R^2CO—N—CH_2—CH—CH—CH—CH—CH_2OH \\ | \\ OH \end{array} \qquad (III)$$

Preferred polyhydroxyfatty acid amides are fatty acid-N-alkyl glucamides corresponding to formula (III), in which $R^3$ is hydrogen or an amine group and $R^2CO$ is the acyl radical of caproic acid, caprylic acid, capric acid, lauric acid, myristic acid, palmitic acid, palmitoleic acid, stearic acid, isostearic acid, oleic acid, elaidic acid, petroselic acid, linoleic acid, linolenic acid, arachic acid, gadoleic acid, behenic acid or erucic acid or technical mixtures thereof. Fatty acid-N-alkyl glucamides (III) obtained by reductive amination of glucose with methyl amine and subsequent acylation with lauric acid or $C_{12-14}$ coconut oil fatty acid or a corresponding derivative are particularly preferred.

c) Suitable organic and inorganic builders are soluble and/or insoluble components showing a mildly acid, neutral or alkaline reaction which are capable of precipitating or complexing calcium ions.

c1) Suitable and, in particular, ecologically safe builders, such as finely crystalline synthetic water-containing zeolites of the NaA type, which have a calcium binding capacity of 100 to 200 mg CaO/g (as determined in accordance with DE-A 24 12 837), are preferably used. Their average particle size is normally in the range from 1 to 10 µm (as measured with a Coulter Counter, volume distribution). Suitable substitutes or partial substitutes for phosphates and zeolites are crystalline, layer-form sodium silicates corresponding to general formula (IV):

$$NaMSi_xO_{2x+1} \cdot y\ H_2O \qquad (IV)$$

in which M is sodium or hydrogen, x is a number of 1.9 to 4 and y is a number of 0 to 20, preferred values for x being 2, 3 or 4. Crystalline layer silicates such as these are described, for example, in European patent application EP-A 0 164 514. Preferred crystalline layer silicates (IV) are those in which M is sodium and x has a value of 2 or 3. Beta- and delta-sodium disilicates corresponding to formula (V):

$$Na_2Si_2O_5 \cdot y\ H_2O \qquad (V)$$

are particularly preferred, beta-sodium disilicate being obtainable, for example, by the process described in German patent application DE-A 39 39 919.

c2) Other suitable builder components, which may be used in particular together with the zeolites, re layer compounds of the hydrotalcite type and (co)polymeric polycarboxylate, such as polyacrylates, polymethacrylates and, in particular, copolymers of acrylic acid with maleic acid, preferably those of 50% to 10% maleic acid. The relative molecular weight of the homopolymers is generally in the range from 1,000 to 100,000 while the relative molecular weight of the copolymers is generally in the range from 2,000 to 200,000 and preferably in the range from 50,000 to 120,000, based on free acid. A particularly preferred acrylic acid/maleic acid copolymer has a relative molecular weight of 50,000 to 100,000. Suitable, but less preferred compounds of this class are copolymers of acrylic acid or methacrylic acid with vinyl ethers, such as vinyl methyl ethers, in which the acid makes up at least 50%. Other suitable compounds of this class are polyacetal carboxylic acids, for example of the type described in U.S. Pat. No. 4,144,226 and U.S. Pat. No. 4,146,495, and also polymeric acids which are obtained by polymerization of acrolein and subsequent disproportionation with alkalis and which are made up of acrylic acid units and vinyl alcohol units or acrolein units.

c3) Other suitable organic builders are the polycarboxylic acids preferably used in the form of their sodium salts, such as citric acid, ethylene diamine tetraacetic acid (EDTA) and nitrilotriacetic acid (NTA), providing their use is not ecologically objectionable.

c4) Other suitable ingredients of the wetting agents, detergents and/or cleaning products are water-soluble inorganic alkalizing agents, such as bicarbonates, carbonates or silicates; alkali metal carbonate and alkali metal silicate, above all sodium silicate with a molar ratio of $Na_2O$ to $SiO_2$ of 1:1 to 1:4.0, are particularly suitable.

d) The other detergent ingredients include redeposition inhibitors (soil suspending agents), foam regulators, bleach activators, optical brighteners, fabric softeners, dyes and fragrances and also neutral salts. Other important detergent ingredients are, for example, bleaches and enzymes. According to the invention, however, these components are separately added last to the mixtures of useful materials used.

d1) In order to obtain an improved bleaching effect at washing temperatures of 60° C. and lower, bleach activators may be incorporated. Examples of suitable bleach activators are N-acyl or O-acyl compounds which form organic peracids with $H_2O_2$, preferably N,N'-tetraacylated diamines, such as N,N,N', N'-tetraacetyl ethylene diamine, and also carboxylic anhydrides and esters of polyols, such as glucose pentaacetate.

d2) The function of redeposition inhibitors is to keep the soil detached from the fibers suspended in the liquor and thus to prevent discoloration. Suitable redeposition inhibitors are water-soluble, generally organic colloids, such as for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches etc., may also be used. The same applies to polyvinyl pyrrolidone (PVP).

d3) Suitable foam regulators are combinations of suitable surfactants. A reduction can also be obtained by additions of non-surface-active organic compounds. In many cases, reduced foaming, which is desirable for washing machines, is achieved by combining various types of surfactants, for example sulfates and/or sulfonates with nonionic surfactants and/or with soaps. In the case of soaps, the foam-inhibiting effect increases with the degree of saturation and the carbon chain length of the fatty acid component. Accordingly, suitable foam-inhibiting soaps are soaps of natural and synthetic origin which have a high percentage content of $C_{18-24}$ fatty acids. Suitable non-surface-active foam inhibitors are organopolysiloxanes and mixtures thereof with microfine, optionally silanized silica, paraffins, waxes, microcrystalline waxes and mixtures thereof with silanized silica. Bisacylamides derived from $C_{12-20}$ alkyl amines and $C_{2-6}$ dicarboxylic acids may also be used. Mixtures of various foam regulators, for example mixtures of silicones and paraffins or waxes, may also be used with advantage. The foam regulators or inhibitors are preferably adsorbed to a granular carrier substance soluble or dispersible in water.

d4) Suitable optical brighteners are derivatives of diaminostilbene disulfonic acid or alkali metal salts thereof, for example salts of 4,4'-bis-(2-anilino-4-morpholino-1,3,5-triazin-6-ylamino)stilbene-2,2'-disulfonic acid or compounds of similar structure in which the morpholino group is replaced by a diethanolamino group, a methylamino group, an anilino group or a 2-methoxyethylamino group. Brighteners of the substituted 4,4'-distyryl diphenyl type, for example the compound 4,4'-bis-(4-chloro-3-sulfostyryl)-diphenyl, may also be present. Mixtures of the brighteners mentioned above may also be used.

d5) In another preferred embodiment of the invention, white products are always obtained if, in addition to the usual optical brighteners, the detergents also contain small quantities of a blue dye. A particularly preferred dye is Tinolux® (a product of Ciba-Geigy).

e) In order to improve the rapid dissolution of basically poorly soluble components, for example corresponding anionic surfactants, such as FAS, even at room temperature or only moderately elevated temperatures, it can be important to use so-called structure breakers which, in many cases, are extremely effective in only very small quantities, based on anionic surfactant.

e1) Suitable structure breakers may be selected from a number of both solid and liquid substances which are hydrophilic, soluble in water or dispersible in water. Suitable structure breakers are, for example, lower polyalkylene glycols which are derived from linear or branched glycols containing 2 to 6 carbon atoms, preferably polyethylene glycol or polypropylene glycol, and which have a relative molecular weight of 200 to 12,000. Particularly preferred structure breakers are polyethylene glycols having a relative molecular weight of 200 to 4,000, liquid polyethylene glycols having a relative molecular weight of up to 2,000 and, more particularly, in the range from 200 to 600 showing particularly advantageous properties.

e2) The sulfates and, in particular, disulfates of lower polyalkylene glycols, more particularly polyethylene glycol and 1,2-propylene glycol, are also suitable. Sulfates and/or disulfates derived from polyethylene glycols and polypropylene glycols having a relative molecular weight of 600 to 6,000 and, more particularly, in the range from 1,000 to 4,000 are particularly preferred. The disulfates generally originate from polyglycol ethers which can be formed in the alkoxylation of alcoholic components through the presence of traces of water.

e3) Another group of suitable structure breakers consists of the water-soluble salts of monosuccinates and/or disulfosuccinates of lower polyalkylene glycols. Of particular significance in this regard are the corresponding polyethylene glycol and polypropylene glycol compounds, sulfosuccinates and disulfosuccinates of polyglycol ethers having a relative molecular weight in the range from 600 to 6,000 and, more particularly, in the range from 1,000 to 4,000 being particularly preferred.

Salts and preferably alkali metal salts, more particularly sodium and potassium salts, and also ammonium salts and/or salts of organic amines, for example triethanolamine, are suitable for the use of the anionically modified polyalkylene glycols as structure breakers. The most important salts for practical application are the sodium salts of the sulfates, disulfates, sulfosuccinates and disulfosuccinates of polyethylene glycol and polypropylene glycol.

Mixtures of the polyalkylene glycols and their anionically modified derivatives in any ratio are also preferably used. A mixture of polyalkylene glycol and the sulfosuccinates and/or disulfosuccinates of the polyalkylene glycols is particularly preferred. However, a mixture of polyalkylene glycol and the corresponding sulfates and/or disulfates and a mixture of polyalkylene glycol and the corresponding sulfates and/or disulfates and also the corresponding sulfosuccinates and/or sulfodisuccinates are also suitable.

e4) Other suitable structure breakers preferably used in accordance with the invention are the adducts of approx. 20 to approx. 80 moles of ethylene oxide with 1 mole of an aliphatic alcohol essentially containing 8 to 20 carbon atoms which are well known ingredients of detergents and cleaning products. Of particular importance are the adducts of 20 to 60 moles and, more particularly, 25 to 45 moles of ethylene oxide with primary alcohols, such as for example coconut oil fatty alcohol or tallow fatty alcohol, with oleyl alcohol, with oxoalcohols or with secondary alcohols containing 8 to 18 and preferably 12 to 18 carbon atoms. Examples of particularly preferred structure breakers from the group of highly ethoxylated alcohols are tallow fatty alcohol containing 30 EO and tallow fatty alcohol containing 40 EO. It is also preferred to use mixtures containing highly ethoxylated alcohols, for example mixtures of tallow fatty alcohol containing 40 EO and water or mixtures of tallow fatty alcohol containing 40 EO and polyethylene glycol having a relative molecular weight of 200 to 2,000.

e5) Other suitable structure breakers are ethoxylated, vicinal internal alkanediols or 1,2-alkanediols with a carbon chain containing 8 to 18 carbon atoms and 4 to 15 moles of ethylene oxide per mole diol. Only one of the two OH groups or both OH groups of the alkanediol can be ethoxylated.

e6) Other suitable structure breakers are modified nonionic surfactants terminated by an acid group. The nonionic surfactants in question are nonionic surfactants, more particularly fatty alcohols, in which one OH group has been converted into a group containing a carboxyl group. Accordingly, nonionic surfactants terminated by an acid group include esters or partial esters of a nonionic surfactant with a polycarboxylic acid or a polycarboxylic anhydride. Examples of acid-terminated nonionic surfactants are the known polyether carboxylic acids and esters or semi-esters of $C_{8-18}$ alcohols with succinic anhydride, maleic anhydride, maleic acid or citric acid.

e7) Another group of suitable structure breakers consists of alkylene glycol monoalkyl ethers corresponding to general formula (VI):

$$R^4O(CH_2CH_2O)_nH \qquad (VI)$$

in which $R^4$ is a radical containing 2 to 6 carbon atoms and n is a number of 1 to 8. Examples of this group of additives are ethylene glycol monoethyl ether and diethylene glycol monobutyl ether.

The following Examples are intended to illustrate the invention without limiting it in any way.

EXAMPLES

Example 1

In an experimental pilot-plant spray drying tower of the "Minor Production" type manufactured by Niro-Atomizer, a slurry of the sodium salt of a $C_{16/18}$ fatty alcohol sulfate was converted by addition of sodium carbonate into a free-flowing surfactant powder. The mixing ratio between the anionic surfactant and sodium carbonate was 4:1, based on dry matter.

The aqueous slurry of the fatty alcohol sulfate used is a white to pale yellow firm paste having the following characteristic data:

| | |
|---|---|
| Washing-active substance (Epton) | 54–58% by weight |
| Fatty alcohol sulfate | 53–55% by weight |
| Unsulfonated | 1–3% by weight |
| NaCl content | <= 1% by weight |
| $Na_2SO_4$ content | <= 2% by weight |
| pH value (3% aqueous preparation) | 10–11.5 |

After the aqueous soda solution had been added, the slurry had a dry matter content of 47.7% by weight.

The following operating parameters were established for drying with superheated steam:

| | |
|---|---|
| Steam entry temperature | 250° C. |
| Steam exit temperature | 175–180° C. |
| Reduced pressure in tower | 16 mbar |
| Feed pump pressure | 5.5 bar |
| Feed temperature | 80° C. |
| Feed throughput | 12 kg/h |

-continued

| Steam throughput Propellent gas for the two-component nozzle | approx. 350 m³/h |
|---|---|
| quantity | 3.3 m³/h |
| pressure | 0.2 bar |

The product obtained had a dry matter content of 99.2% by weight and an apparent density of 293 g/l. 90% solubility in water at 20° C. was achieved after 40 seconds. The carrier beads obtained in this way were subsequently charged with liquid nonionic surfactant.

The liquid nonionic surfactant was added to the anionic surfactant powder in a Lödige mixer. The nonionic surfactant was a 4:1 mixture of a $C_{12/14}$ fatty alcohol containing 3 EO and a $C_{12/14}$ fatty alcohol containing 5 EO.

The following operating parameters were established:

| Mixer speed | 385 r.p.m. |
|---|---|
| Addition rate of the nonionic surfactant | 2.3 g/min. |
| Aftermixing time | 1 min. |
| Temperature of the surfactant powder | 25° C. |
| Temperature of the nonionic surfactant added | 54° C. |

14% By weight nonionic surfactant, based on the weight of the anionic surfactant powder, was added. After charging with nonionic surfactant, the surfactant powder had an apparent density of 380 g/l. 90% solubility in water at 20° C. was achieved in 20 seconds.

Example 2

The procedure was as in Example 1. The aqueous slurry dried had a solids content of 53.3% by weight and consisted of the sodium salt of a $C_{16/18}$ fatty alcohol sulfate mentioned in Example 1 and a fine-particle sodium aluminium silicate (detergent-quality zeolite NaA) in the form of a 48% suspension stabilized with 1.5% by weight of tallow alcohol polyglycol ether. The mixing ratio (dry weight) of anionic surfactant to silicate was 2:1. The dry product had an apparent density of 316 g/l and a solubility of 10 seconds. The powder containing anionic surfactant was then charged with 10% by weight of nonionic surfactant. The nonionic surfactant used was a mixture of 19 parts of the $C_{12/14}$ fatty alcohol·3 EO mentioned in Example 1 and $C_{12/14}$ fatty alcohol·5 EO and 1 part of a tallow fatty alcohol containing about 40 moles of EO. The solidification range of the tallow fatty alcohol was between 42° and 47° C. The nonionic surfactant mixture was added in liquid form at 54° C. to the powder-form product dried with superheated steam. The impregnated material had an apparent density of 492 g/l and a solubility of less than 10 seconds.

Example 3

The procedure was as in Examples 1 and 2. A slurry having a solids content of 24.1% was dried in the superheated steam phase. The solid constituents of the starting mixture were the sodium salt of a $C_{16/18}$ fatty alcohol sulfate mentioned in Example 1, the disodium salt of a $C_{16/18}$ alpha-sulfofatty acid and sodium carbonate mixed in a ratio of 4:1:1. The dried carrier bead powder had an apparent density of 220 g/l and a solubility (90%) of 20 seconds. The dried material was impregnated with 14% by weight of nonionic surfactant. The nonionic surfactant used was a 4:1 mixture of a $C_{12/14}$ fatty alcohol·3 EO and a $C_{12/14}$ fatty alcohol·5 EO. After impregnation with the nonionic surfactant, the material had an apparent density of 310 g/l and a solubility (90%) of 16 seconds.

Example 4

Various mixtures of anionic surfactant components and water-soluble inorganic auxiliaries in the form of an aqueous slurry were sprayed through a two-component nozzle (propellent gas nitrogen) in the same way as in Example 1 and dried in countercurrent with superheated steam.

The mixtures used, the mixing ratios of the components in the particular mixture, based on dry matter, the apparent densities in g/l obtained in the dry product, the residual moisture content in % by weight and the solubility (90%) under standard conditions in water (20° C.) are set out in the following Table where Sulfopon T55 (a product of Henkel KGaA)=anionic surfactant based on fatty alcohol sulfate
Disalt=Na disalt of a $C_{16/18}$ alpha-sulfofatty acid mixture
Dehydol TA40=tallow alcohol ethoxylate (on average 40 EO)
Waterglass A=detergent-quality water-soluble sodium silicate.

The above-mentioned data of the described mixtures dried to form porous carrier beads are summarized in the following Table. The comparatively high dissolving rates expressed in solubility figures (90%) are striking although considerable quantities of the anionic surfactant components basically poorly soluble in cold water are present in each of the mixtures.

TABLE 1

Test results
Percentages in % by weight

| Composition | MR | AD g/l | RM % | S90 min/s |
|---|---|---|---|---|
| Sulfopon T55 + waterglass A | 50:50 | 267 | 1.46 | 1/01 |
| Sulfopon T55 + waterglass A | 70:30 | 209 | 1.52 | 0/27 |
| Sulfopon T55 + soda | 80:20 | 251 | 0.81 | 1/00 |
| Sulfopon T55 + soda | 90:10 | 285 | 4.02 | 2/14 |
| Disalt | — | 187 | 1.25 | 0/22 |
| Sulfopon T55 + disalt | 2:1 | 230 | 0.92 | 0/32 |
| Sulfopon T55 + disalt + soda | 4:1:1 | 220 | 1.07 | 0/20 |
| Sulfopon T55 + soda | 70:30 | 198 | n.d. | 0/22 |
| Sulfopon T55 + soda + Dehydol TA40 | 70:20:10 | 218 | n.d. | 0/16 |
| Sulfopon T55 + soda + Dehydol TA40 | 75:20:5 | 143 | n.d. | 0/18 |

Legend:
MR = Mixing ratio (based on dry matter)
AD = Apparent density
RM = Residual moisture
S90 = Solubility (90%)
n.d. = Not determined

Example 5

The mixture for obtaining a tower powder for the production of a laundry detergent ("Persil Color", a product of Henkel KGaA) is dried with superheated steam to form a free-flowing tower powder in the same spray drying tower used for Example 1. By varying the working conditions, different apparent densities are established in the non-impregnated dried tower powder (referred to in the following Table as a "apparent density-1").

The steam-dried tower powders are subsequently impregnated in a Lödige mixer with various quantities of a nonionic surfactant based on fatty alcohol ethoxylate ("Dehydol LST 80/20", a product of Henkel KGaA). On the one hand various quantities of nonionic surfactant and, on the other hand, variations in the temperature of the dried tower powders and/or in the temperature of the nonionic surfactant during application to the carrier beads (tower powder) are selected.

Particulars of the working conditions, the apparent densities obtained in the impregnated end product (referred to as "apparent density-2") and solubility (90%) in water at 20° C. in seconds are set out in the following Table.

TABLE 2

Test results
Percentages in % by weight

| AD1 g/l | ON % | TP °C. | ST °C. | AD2 g/l | S90 s |
|---|---|---|---|---|---|
| 480 | 20.0 | 26 | 26 | 480 | 12 |
| 480 | 10.0 | 26 | 26 | 560 | <10 |
| 480 | 10.0 | 26 | 43 | 580 | 6 |
| 480 | 15.0 | 26 | 40 | 520 | <10 |
| 480 | 12.0 | 26 | 46 | 560 | <10 |
| 409 | 10.0 | 26 | 35 | 460 | 6 |
| 409 | 11.5 | 26 | 39 | 460 | 16 |
| 570 | 11.5 | 42 | 50 | 591 | 8 |
| 570 | 15.0 | 41 | 50 | 598 | 8 |
| 570 | 20.0 | 40 | 51 | 569 | 13 |
| 570 | 11.5 | 58 | 42 | 610 | 6 |
| 570 | 15.0 | 61 | 50 | 630 | 10 |
| 570 | 20.0 | 60 | 46 | 590 | 9 |

Legend:
AD1 = Apparent density-1
QN = Quantity of nonionic surfactant
TP = temperature
ST = Surfactant temperature
AD2 = Apparent density-2
S90 = Solubility (90%)

Example 6

In a series of further tests, the tower powder dried with superheated steam in accordance with Example 5 is impregnated in a Lödige mixer with a 50% aqueous preparation of a nonionic surfactant based on alkyl glycoside ("APG 600", a product of Henkel KGaA).

The starting apparent density of the laundry detergent tower powder used after drying is 570 g/l. The quantities of nonionic surfactant applied, the temperature of the tower powder in the Lödige mixer, the apparent density of the impregnated tower powder (apparent density-2), the solubility values in seconds (90%) and the residual moisture contents determined are set out in Table 3 below. The surfactant temperature during application in the Lödige mixer was 40° C. in every case.

TABLE 3

Test results
Percentages in % by weight

| ON % | TP °C. | AD2 g/l | S90 s | RM % |
|---|---|---|---|---|
| — | — | — | 4 | 7.26 |
| 11.5 | 56 | 560 | 22 | 5.87 |
| 15.0 | 48 | 535 | 28 | 7.77 |
| 20.0 | 56 | 610 | 40 | 7.75 |
| 18.0 | 60 | 560 | 30 | 6.84 |

Example 7

In a Lödige mixer, a number of carrier beads dried with superheated steam, which had been produced in accordance with the invention by drying mixtures based on selected anionic surfactants (Sulfopon T55 and "disalt" of the type mentioned above), optionally in admixture with soda, in a first process step, are impregnated with the APG-based nonionic surfactant according to Example 6.

The materials used—referred to as "tower powders" in Table 4 below—the apparent densities of the materials used (apparent density-1), the quantity of the 50% surface-active APG 600 component applied in the second process step, the working conditions, the apparent density of the impregnated carrier beads (apparent density-2) and the measured solubility (90%) and residual moisture values are set out in Table 4 below.

TABLE 4

Test results
Percentages in % by weight

| Tower powder | AD1 g/l | ON % | TP °C. | ST °C. | AD2 g/l | S90 m/s | RM % |
|---|---|---|---|---|---|---|---|
| Sulfopon T55 + soda (80:20) | 237 | — | | | | 1/56 | 1.13 |
| | 251 | — | | | | 1/00 | 0.81 |
| Sulfopon T55 + soda (80:20) | 237 | 11.5 | 70 | 50 | 500 | —/50 | 2.46 |
| Sulfopon T55 + soda (80:20) | 237 | 6.7 | 57 | 54 | 400 | —/40 | 2.49 |
| Sulfopon T55 + disalt (2:1) | 230 | — | | | | —/32 | 0.92 |
| Sulfopon T55 + disalt (2:1) | 230 | 12.0 | 26 | 45 | 330 | 1/20 | 2.98 |
| Sulfopon T55 + disalt + soda (4:1:1) | 220 | — | | | | —/20 | 1.07 |
| Sulfopon T55 + disalt + soda (4:1:1) | 220 | 12.0 | 21 | 50 | 350 | —/40 | 3.20 |

Example 8

Anionic surfactant (Sulfopon T55) in admixture with small quantities of soda (mixing ratios 80:20 and 70:30) were subjected to spray drying with superheated steam in accordance with the invention in the form of an aqueous preparation as in Example 1. The surfactant/soda mixture is then made up into superheated-steam-dried carrier beads in the same way using a small quantity of structure breaker (Dehydol TA 40)—mixing ratio of Sulfopon T55 to soda to structure breaker=75:20:5.

The apparent densities and solubilities (90%) of these non-impregnated carrier beads are determined.

Samples of the carrier beads are then impregnated in a Lödige mixer with a mixture of nonionic surfactant and PEG 400. A mixture of 3 parts by weight fatty alcohol ethoxylate (Dehydol LST 80/20) and 1 part PEG 400 is used as the nonionic surfactant mixture.

The apparent densities and solubility in water at 20° C. (90%) of the impregnated products are determined.

The working conditions for the particular impregnation stage of the carrier beads and the product data determined are set out in Table 5 below.

TABLE 5

Test results
Percentages in % by weight

| Tower powder | AD1 g/l | ON % | TP °C. | ST °C. | AD2 g/l | S90 m/s |
|---|---|---|---|---|---|---|
| Sulfopon T55 + soda (80:20) | 224 | | | | | —/40 |
| Sulfopon T55 + soda (80:20) | 224 | 12.0 | 21 | 50 | 340 | —/36 |
| Sulfopon T55 + soda (70:30) | 193 | | | | | —/22 |
| Sulfopon T55 + soda (70:30) | 193 | 13.0 | 21 | 48 | 330 | —/32 |
| Sulfopon T55 + soda + Dehydol TA40 (75:20:5) | 143 | | | | | —/18 |
| Sulfopon T55 + soda + TA40 (75:20:5) | 143 | 12.0 | 21 | 53 | 350 | 1/46 |

A series of other comparison tests was carried out with a nonionic surfactant mixture of the same components, but with very much less of the PEG 400 component. The mixing ratio of the nonionic surfactant (Dehydol LST 80/20) to the PEG 400 was 19:1. The results obtained are set out in Table 6 below.

TABLE 6

Test results
Percentages in % by weight

| Tower powder | AD1 g/l | ON % | TP °C. | ST °C. | AD2 g/l | S90 m/s |
|---|---|---|---|---|---|---|
| Sulfopon T55 + soda (80:20) | 224 | | | | | —/40 |
| Sulfopon T55 + soda (80:20) | 224 | 17.0 | 25 | 45 | 380 | —/20 |
| Sulfopon T55 + soda + Dehydol TA40 (75:20:5) | 143 | | | | | —/18 |
| T55 + soda + TA40 (75:20:5) | 143 | 14.0 | 25 | 52 | 315 | —/24 |

The distinct increase in the dissolving rate in aqueous phase in the case of the carrier beads used as a three-component mixture is particularly noticeable.

Example 9

A series of tests comparable with Example 8 uses a highly ethoxylated fatty alcohol nonionic surfactant (Dehydol TA 40) as the solubility-improving auxiliary (structure breaker) both in the production of the non-impregnated carrier beads dried with superheated steam and in the composition of the nonionic surfactant impregnation applied in the second stage.

A first series of tests (Table 7) uses comparatively large quantities of the structure breaker (ratio by weight of Dehydol LST 80/20 to Dehydol TA 40=3:1) in the nonionic surfactant mixture used as liquid phase while a second series of tests (Table 8) uses a much smaller quantity of the structure breaker in the impregnating liquid–mixing ratio of nonionic surfactant (Dehydol LST 80/20) to structure breaker (Dehydol TA 40)=19:1. The working conditions, the measured apparent densities of the dried non-impregnated carrier beads and the impregnated surfactant mixtures and also the solubilities (90%) in water at 20° C. are set out in Tables 7 and 8 below.

TABLE 7

Test results
Percentages in % by weight

| Tower powder | AD1 g/l | ON % | TP °C. | ST °C. | AD2 g/l | S90 m/s |
|---|---|---|---|---|---|---|
| Sulfopon T55 + soda (80:20) | 224 | | | | | —/40 |
| Sulfopon T55 + soda (80:20) | 224 | 14.0 | 45 | 50 | 260 | —/20 |
| Sulfopon T55 + soda (70:30) | 198 | | | | | —/22 |
| Sulfopon T55 + soda (70:30) | 198 | 14.0 | 40 | 55 | 390 | —/24 |
| Sulfopon T55 + soda + Dehydol TA40 (70:20:10) | 218 | | | | | —/16 |
| Sulfopon T55 + soda + TA40 (70:20:10) | 218 | 16 | 21 | 55 | 340 | —/32 |
| Sulfopon T55 + soda + Dehydol TA40 (75:20:5) | 143 | | | | | —/18 |
| Sulfopon T55 + soda + TA40 (75:20:5) | 143 | 20.0 | 25 | 45 | 350 | —/30 |

TABLE 8

Test results

Nonionic surfactant: Dehydol LST 80/20 + Dehydol TA 40 (19:1)
Test apparatus: Lödige mixer
Percentages in % by weight

| Tower powder | AD1 g/l | ON % | TP °C. | ST °C. | AD2 g/l | S90 m/s | RM % |
|---|---|---|---|---|---|---|---|
| Sulfopon T55 + soda (80:20) | 224 | | | | | —/40 | |
| Sulfopon T55 + soda (80:20) | 224 | 16.0 | 25 | 48 | 220 | —/15 | |
| Sulfopon T55 + soda (70:30) | 224 | | | | | —/22 | |
| Sulfopon T55 + soda (70:30) | 224 | 21.0 | 25 | 45 | 270 | —/36 | |
| Sulfopon T55 + soda (70:30) | 224 | 18.0 | 25 | 41 | 230 | —/20 | |
| Sulfopon T55 + soda + Dehydol TA40 (75:20:5) | 143 | | | | | —/18 | |
| Sulfopon T55 + soda + TA40 (75:20:5) | 143 | 17.5 | 25 | 50 | 295 | —/17 | 2.7 |

The improvement in solubility with decreasing quantities of the structure breaker used as auxiliary solvent is noticeable in this case, too.

Example 10

In an experimental pilot-plant spray drying tower of the "Minor Production" type manufactured by Niro-Atomizer, a slurry of the sodium salt of a $C_{16/18}$ fatty alcohol sulfate was converted by addition of sodium carbonate into a free-flowing surfactant powder. The mixing ratio between the anionic surfactant and sodium carbonate was 4:1, based on dry matter.

The aqueous slurry of the fatty alcohol sulfate used is a white to pale yellow firm paste having the following characteristic data:

| | |
|---|---|
| Washing-active substances (Epton) | 54–58% by weight |
| Fatty alcohol sulfate | 53–55% by weight |
| Unsulfonated | 1–3% by weight |
| NaCl content | <= 1% by weight |
| $Na_2SO_4$ content | <= 2% by weight |
| pH value (3% aqueous preparation) | 10–11.5 |

The following operating parameters were established for drying with superheated steam:

| | |
|---|---|
| Steam entry temperature | 250° C. |
| Steam exit temperature | 175–180°C. |
| Reduced pressure in tower | 16 mbar |
| Feed pump pressure | 5.5 bar |
| Feed temperature | 80° C. |
| Feed throughput | 12 kg/h |
| Steam throughput | approx. 350 m³/h |
| Propellent gas for the two-component nozzle | |
| quantity | 3.3 m³/h |
| pressure | 0.2 bar |

The product obtained had a dry matter content of 99.2% by weight and an apparent density of 293 g/l. 90% solubility in water at 20° C. was achieved after 40 seconds. The carrier beads obtained in this way were subsequently charged with water and/or a mixture of nonionic surfactant and polyethylene glycol (average molecular weight 400). The nonionic surfactant was a 4:1 mixture of a $C_{12-14}$ fatty alcohol •3 EO and a $C_{12/14}$ fatty alcohol •5 EO (Dehydol LST 80/20®, a product of Henkel KGaA).

The liquid components mentioned above were added either in a Lödige mixer or in an Aeromatic STREA-1 fluidized bed spray granulator.

The following operating parameters were established:

| | |
|---|---|
| 1) Mixer | |
| Mixer speed | 385 r.p.m. |
| Quantity of steam-dried surfactant powder | 5 kg |
| Addition rate | 2.3 g/min. |
| Aftermixing time | 1 min. |
| Temperature of surfactant powder | 25° C. |
| Temperature of liquid component added | 25° C. |
| 2) Fluidized bed | |
| Air throughput rate | 140 m³/h |
| Quantity of steam-dried surfactant powder | 1 kg |
| Addition rate | 6 g |
| Temperature of liquid component added | 25° C. |

The quantities of liquid component sprayed on in by weight, the solubility (90%) in water at 20° C. and the corresponding apparent densities are set out in Table 9.

TABLE 9

| Test results (percentages in % by weight) | | | | | |
|---|---|---|---|---|---|
| Liquid component | | | | | |
| Water | Nonionic surfactant + PEG 400, ratio 19:1 % | Mixer | Fluidized bed | S90 m/s | AD g/l |
| 10 | — | X | — | 1/— | 245 |
| 10 | — | — | X | —/50 | 261 |
| 20 | — | — | X | 1/— | 210 |
| 16 | 1 | X | — | —/40 | 260 |
| 6 | 2 | X | — | —/30 | 223 |
| 4 | 4 | X | — | —/28 | 221 |
| — | 6 | X | — | —/30 | 247 |

The compound of steam-dried surfactant powder and liquid component was then granulated in a Leistritz extruder and in a Schlüter pellet press. The fine particles (<0.4 mm) and the oversize particles (>1.25 mm) were removed by sieving. The particle fraction with diameter of 0.4 to 1.25 mm had the following granule properties (Table 10):

TABLE 10

| Liquid component | | | | | | |
|---|---|---|---|---|---|---|
| Water | Nonionic surfactant + PEG 400, ratio 19:1 % | Extruder | Pellet press | S90 m/s | AD g/l | RM % |
| 10 | — | — | X | 4/50 | 482 | 5.2 |
| 10 | — | X | — | 8/20 | 580 | 4.9 |
| 20 | — | X | — | 2/25 | 532 | 14.2 |
| 30 | — | X | — | 2/10 | 455 | 10.5 |
| 40 | — | X | — | 3/20 | 397 | 20.7 |
| 20 | 10 | — | X | 4/40 | 542 | 5.2 |
| 16 | 1 | — | X | 3/10 | 482 | 7.7 |
| 6 | 2 | — | X | 2/50 | 527 | 10.9 |
| 4 | 4 | — | X | 2/45 | 517 | 4.7 |
| — | 6 | — | X | 3/— | 480 | 7.3 |

The surfactant-rich granules are dust-free and neutral in odor and have a uniform particle size distribution. Their apparent density is of the order of 500 g/l. Their solubilities vary between 2 and 3 minutes at 20° C., depending on the type and quantity of wetting liquid used. If necessary, the granules may be "dusted" with calcium carbonate powder (3% by weight) to stop them from sticking together. The $CaCO_3$ is added in a Marumerizer®.

We claim:

1. A process for producing free-flowing granules comprising the steps of:

(a) drying with a drying gas consisting of superheated steam an aqueous mixture containing at least one surfactant selected from the group consisting of anionic surfactants and nonionic surfactants to form carrier granules having a porous inner structure, and (b) impregnating said porous inner structure of said carrier granules with an aqueous composition containing wetting agents selected from the group consisting of nonionic surfactants and anionic surfactants, cleaning agents selected from the group consisting of inorganic and organic builder components, and mixtures thereof, to form an impregnated carrier granule.

2. The process of claim 1 wherein at least 10% by volume of said porous inner structure of said carrier granules is impregnated with said composition.

3. The process of claim 1 wherein at least 50% by volume of said porous inner structure of said carrier granules is impregnated with said composition.

4. The process of claim 1 wherein said carrier granules are solids at temperatures in the range from about 100° to 110° C. and are non-tacky and free-flowing.

5. The process of claim 1 wherein said carrier granules have an apparent density of above about 200 g/l.

6. The process of claim 1 wherein said one surfactant is present in an amount of at least 10% by weight, based on the weight of said aqueous mixture.

7. The process of claim 1 wherein said one surfactant of said carrier granule is an anionic surfactant.

8. The process of claim 7 wherein said anionic surfactant is selected from the group consisting of soaps, alkylbenzene sulfonates, fatty alcohol sulfates, fatty alcohol ether sulfates, ester sulfonates, disalts, and mixtures thereof.

9. The process of claim 1 wherein said aqueous mixture contains tower powders in an amount of up to 50% by weight, based on the weight of the aqueous mixture.

10. The process of claim 1 wherein said aqueous mixture contains up to 60% by weight, based on the weight of the aqueous mixture, of an auxiliary component selected from the following detergent builders, redeposition inhibitors, discoloration inhibitors, foam regulators, bleach activators, optical brighteners, dyes, water-soluble inorganic alkalizing agents, fabric softeners, fragrances, neutral salts, structure breakers and mixtures thereof.

11. The process of claim 1 wherein said aqueous mixture further contains water-soluble or water-insoluble inorganic or organic materials in a weight ratio of about 1:1.

12. The process of claim 1 wherein said composition is present in an amount of from about 3 to 80% by weight, based on the dry weight of said granules.

13. The process of claim 1 wherein said composition comprises a nonionic surfactant.

14. The process of claim 1 further including applying a coating onto an exterior surface of said impregnated carrier granule of step (b).

* * * * *